(12) United States Patent
Maeder

(10) Patent No.: US 8,823,953 B2
(45) Date of Patent: Sep. 2, 2014

(54) OPTICAL POSITION DETECTION

(75) Inventor: Carl Conrad Maeder, Hittnau (CH)

(73) Assignee: Ferag AG, Hinwil (CH)

( * ) Notice: Subject to any disclaimer, the term of this patent is extended or adjusted under 35 U.S.C. 154(b) by 866 days.

(21) Appl. No.: 12/736,686

(22) PCT Filed: May 13, 2009

(86) PCT No.: PCT/CH2009/000156
§ 371 (c)(1),
(2), (4) Date: Oct. 29, 2010

(87) PCT Pub. No.: WO2009/140778
PCT Pub. Date: Nov. 26, 2009

(65) Prior Publication Data
US 2011/0043830 A1    Feb. 24, 2011

(30) Foreign Application Priority Data

May 21, 2008    (CH) ...................................... 0766/08

(51) Int. Cl.
*G01B 11/14*    (2006.01)
(52) U.S. Cl.
USPC ............ 356/615; 356/613; 356/620; 356/622
(58) Field of Classification Search
CPC ....................................................... G01B 11/03
USPC .................. 356/613–615, 620, 622
See application file for complete search history.

(56) References Cited

U.S. PATENT DOCUMENTS

| 2,645,343 | A | 7/1953 | Nemir |
| 6,323,954 | B1 | 11/2001 | Halter |
| 6,424,735 | B1 * | 7/2002 | Freifeld ........................ 382/154 |
| 7,551,296 | B2 * | 6/2009 | Boesser et al. ................ 356/624 |
| 2009/0020938 | A1 | 1/2009 | Honegger |

FOREIGN PATENT DOCUMENTS

| DE | 198 42 192 A1 | 3/2000 |
| DE | 199 60 653 A1 | 6/2000 |
| DE | 100 13 982 A1 | 10/2000 |
| DE | 10 2004 044341 A1 | 5/2005 |
| DE | 10 2007 006333 A1 | 9/2007 |
| DE | 10 2007 025 910 A1 | 12/2008 |
| EP | 0685420 B1 | 8/1998 |
| EP | 1 279 919 | 1/2003 |
| JP | 10 258502 | 9/1998 |
| WO | WO 00/47947 A1 | 8/2000 |
| WO | WO 2007/085101 | 8/2007 |

* cited by examiner

*Primary Examiner* — Kara E. Geisel
*Assistant Examiner* — Iyabo S Alli
(74) *Attorney, Agent, or Firm* — Pauley Petersen & Erickson

(57)    ABSTRACT

Method and apparatus (1*a*) for optical detection of the position of large-area printed products (10). The apparatus (1*a*) has conveyance means (2*a*) for movement of the printed products (10) along a conveyor path (4) past at least one contrasting light source (30), and at least one optical sensor (16). The conveyance means (2, 2*a*), the contrasting light source (30) and optical sensor (16) are arranged such that the printed products (10) can be conveyed between the contrasting light source (30) and the optical sensor (16).

18 Claims, 5 Drawing Sheets

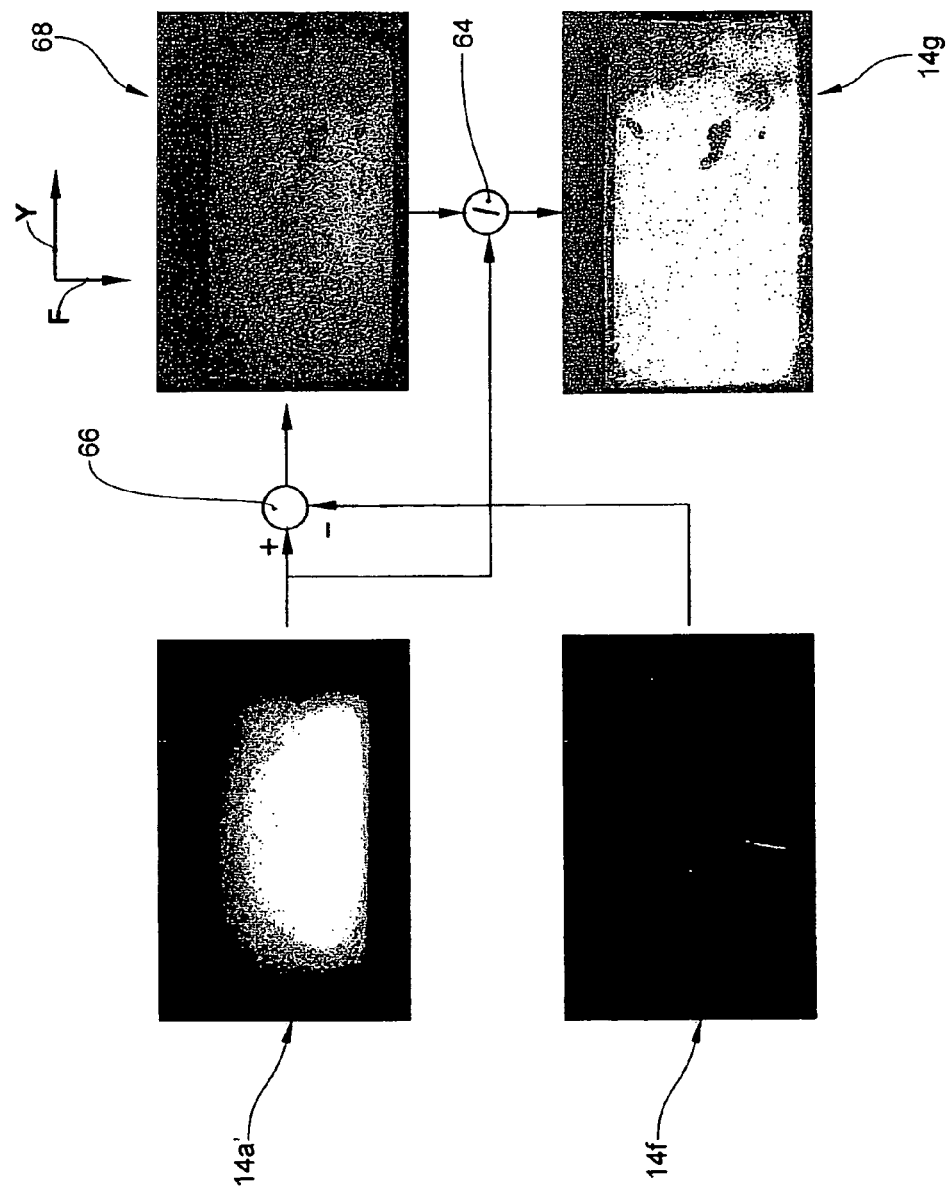

OPTICAL POSITION DETECTION

BACKGROUND OF THE INVENTION

1. Field of the Invention

The present invention falls into the area of the further processing of printed products and relates to a method for optical detection of a position of print shop products according to the preamble of patent claim 1 and to an apparatus for optical detection of a position of print shop products according to the preamble of patent claim 13.

To ensure a desired quality of print shop products during postpress processing, the determination of the orientation and/or the position of printed products is imperative, depending on the case. On account of the often very high processing capacities of currently about 30 000-40 000 copies per hour in high performance systems, non-contacting monitoring system offer advantages, as is known, as compared with mechanical or electromechanical monitoring systems. The prior art discloses a number of optical monitoring systems.

2. Discussion of Related Art

In EP 0685420 B1, for example, it is proposed to subject the part products to optical/electronic monitoring as they are collated, by an image recording device or a reading head registering each part product or a section thereof in synchronism with the delivery cycle. A light emitting means arranged beside the image recording device ensures that the part product or the section thereof is sufficiently lightened. The registered data is processed electronically in an image processing means, by being compared with reference information read in previously or, respectively, a calibration image. If a deliverer or a feed station delivers defective or wrongly oriented part products, then an appropriate control or alarm signal is generated. Since, in the case of this design, it is not possible as a result of the construction to illuminate the part products exactly from the viewing direction of the image recording device in the form of a camera, the illumination is not one hundred percent ideal for the registration by the image recording device.

In DE 10 2007 009 971 A1, a method and an apparatus for recording an image of an edge of a printed sheet are disclosed. An image recording device and/or an illuminating device are guided in parallel and in synchronism with the conveyed sheet. The illuminating device arranged beside the image recording device in this case illuminates a sheet surface in such a way that each sheet edge causes a dark shadowed strip. An image recorded by the image recording device exhibits high contrast between the light sheet and the dark shadow, by using which the sheet edge can be determined by means of electronic image processing.

The known monitoring methods have the disadvantage that the registered images lead to relatively high quantities of data which have to be processed by an image processing unit. Since the apparatus required for this purpose, such as image recording device, image processing unit and data link, has to be correspondingly powerful, it is often costly.

SUMMARY OF THE INVENTION

It is an object of the present invention to develop the existing methods and apparatus further.

The object on which the invention is based for the method is achieved with the features of patent claim 1. Further embodiments are the subject matter of the dependent patent claims 2 to 12.

The object on which the invention is based for the apparatus is achieved with the features of patent claim 13. Further embodiments are the subject matter of the dependent patent claims 14 to 18.

The method is distinguished by the fact that the flat print shop products are guided by a conveying means along a conveying section past at least one contrast light source and at least one optical sensor, the print shop products being guided through between contrast light source and optical sensor.

In the following text, print shop products is to be understood to mean both individual print shop products and also groups of several print shop products. Here, the print shop products each comprise at least one flat, flexible printed product or print shop product which, in turn, can comprise a main product and/or at least one part product. Likewise, a print shop product or several print shop products and/or a printed product or several printed products can be stuffed into an envelope.

The designation contrast light source in the present description designates a location from which contrast light reaches a first side of the print shop products directly. For the present invention, it is not important whether the contrast light has been produced by one or more light emitting means or by means of conversion of the light originating from this light emitting means or these light emitting means, for example by means of homogenization. If the light emitted by the light emitting means reaches the first side of the print shop products indirectly, for example via at least one deflection mirror, that deflection mirror from which the light reaches the first side of the print shop products directly and thus forms the actual contrast light forms the contrast light source. The light emitting means used can be, for example, fluorescent tubes.

In the following text, position of a print shop product will be understood to mean both a relative position of the print shop product with respect to a conveying means and also a relative position of a print shop product with respect to a further print shop product, for example a following print shop product.

One advantage of the method according to the invention resides in the fact that, as compared with conventional optical registration systems, no problems with scattered light occur, which impair and/or make more difficult subsequent data processing.

A further advantage resides in the fact that the method according to the invention, even in the case of thick print shop products, permits good position detection. The term "thickness" is understood to mean the dimension which typically results from the number of pages of the print shop products, the thickness in the present case extending approximately in the direction of a recording direction of the optical sensor. The good position detection is distinguished by the fact that a wrong position or wrong location of a constituent part of the print shop product can be detected, for example of an inserted part product, even when this constituent part is located comparatively close to a side of the print shop product facing away from the optical sensor. By comparison, conventional monitoring methods, in which each edge of the print shop product causes a dark shadowed strip, have trouble with reliable wrong position detection under comparable conditions.

According to the present invention, a first side of the print shop products is irradiated by the contrast light source in such a way that in each case a silhouette is produced, in which the relevant print shop product is depicted as a dark shadow on the otherwise light background and reproduces the contour of this print shop product. The light-dark contrast in the region of the contour is registered by the optical sensor and, as occasion demands, is used further for subsequent image processing. Depending on the requirement on the method or the apparatus, the contour corresponds to a projection of the print shop product onto a plane, it not being necessary for this plane to be flat.

Should an increase in the contrast in the silhouette be necessary, such as is necessary for example in the region of the contour of the print shop product or specific sections thereof, certain regions of the print shop product, such as an edge and/or a corner and/or several corners, are additionally irradiated with contrast light. An additional contrast light source comprises, if required, for example a halogen spotlight, a light emitting diode spotlight, an energy-saving spotlight, a xenon flash lamp, light stimulated from optical fibers or any desired combination thereof.

In a further embodiment, the contrast light source shines homogenized contrast light onto the print shop product. Homogenization can be achieved, for example, by means of light reflectors or a multiplicity of different and/or differently intense light emitting means.

In one embodiment, the conveying means is transparent, so that the print shop products are irradiated by the contrast light source at least partially through the conveying means. In one embodiment, the conveying means comprise a multiplicity of conveyor compartments. These conveyor compartments are perforated in one embodiment for this purpose, the perforation being arranged in particular in the region of the high-contrast image section. It goes without saying that the holes of the perforation do not necessarily have to be circular for this purpose but can have any desired cross section and any desired size, as long as they are able to undertake their task. In a further embodiment of the conveying means (with or without conveyor compartments), instead of perforations said conveying means merely has depressions which permit the passage of light.

Depending on the requirements on the conveying means, the latter has one or even several combinations of the above-mentioned features or elements. In a further embodiment of the conveying means, for example a conveyor belt or gripper, said conveying means is fabricated from a translucent and/or transparent material, the intention not being for "transparent" for the present intended use to be necessarily understood to mean complete transparency to light.

The factor common to all the conveying means just mentioned is that they permit movement of the print shop products along a conveying section past at least one contrast light source and at least one optical sensor, the contrast light source and the optical sensor being arranged on opposite sides of the print shop products. As a result, in particular with respect to the method, the scattered light problems occurring in conventional optical registration systems are ruled out or at least considerably minimized.

In one embodiment of the method, the conveying means are only partly guided through between the contrast light source and the optical sensor. This permits, for example, the use of conventional clamp grippers as conveying means, which are typically opaque, without any departure from the general idea of the invention having to be made.

If the registration of the silhouette by the optical sensor is bound to the cycle rate and does not continuously supply recordings to be processed, an image processing unit connected thereto can be relieved considerably of load in terms of data. This permits the registration and further processing of the images with intelligence of restricted power and thus the use of what are known as "slimmer", that is to say restricted-power, components. In this case, the cycle rate of the optical registration can be varied, depending on the intended use, so that it is independent of accelerations and/or decelerations of the conveying means.

In one embodiment of the method, only a high-contrast image extract from the silhouette registered by the optical sensor is used further. In the high-contrast image extract, an intensive-contrast extract from the compensated silhouette, corresponding to an edge region of a print shop product correctly assembled and correctly deposited with respect to a predefined reference periphery, is to be expected. For this reason, the high-contrast image extract is also called the reference contrast region. As a result of the pre-settable selection of the high-contrast image extract which, as compared with the entire image recorded by the optical sensor, is comparatively small, the amount of data to be processed further is reduced considerably. Small amounts of data offer the advantage that, as a rule, they permit the use of more cost-effective elements such as data links, memories, image processing units and so on than is the case with large amounts of data. In one embodiment of the method, the high-contrast image extract is implemented with a type of electronic mask, which filters out all the image points located outside the high-contrast image extract or reference contrast region and removes them for the subsequent image processing. Depending on the possible way, the filtering out is even carried out in the control unit of the optical sensor. The high-contrast image extract then typically passes through a CCD (charge coupled device) or through an APS (active pixel sensor) to a digital interface, for example an interface according to the IEEE 1394 standard, in order to be processed further and/or evaluated in an image processing unit. The result of the position detection is output as a digital and/or analog signal, depending on the requirement, which can be generated as occasion demands as a binary or analog signal. In the latter case, the signal contains, for example, further information inherent to the print shop product registered, such as the format thereof, which is useful for the further treatment of the registered printed product. In one embodiment, for example, an electronic image of the contour of the respective print shop product is extracted from the silhouette. As occasion demands, the signal is also used as a basis for a decision over the further procedure with the relevant print shop product. As occasion demands, special treatment is, for example, removal or diversion of specific print shop products by using predetermined criteria such as format, size and/or shape or a combination thereof. In one embodiment, the relevant print shop products are not removed from the endless conveying means but, with the effect of special treatment, run through the conveying section a further time, in order for example to permit touching up of defective print shop products. This touching up is carried out as occasion demands manually, automated or partly automated. The factor common to the aforementioned cases is that the signal forms a control signal. In such an application, the separation is already carried out as occasion demands in or after the conveying section of the conveying means. In a further embodiment, the signal/control signal is fed to a machine control or regulating system, which decides about the further course of the processing of the defective print shop products.

In one embodiment, a unit having the optical sensor, for example a video camera or digital camera, contains the image processing unit which calculates the contour of the print shop product. In a further embodiment, this unit also performs the testing as to whether the registered printed product is a print shop product that is correct or a wrongly assembled and positioned print shop product.

The apparatus is distinguished by the fact that it has conveying means for transporting/conveying the print shop products along a conveying section past at least one contrast light source and at least one optical sensor, conveying means, contrast light source and optical sensor being arranged in such a way that the print shop products can be guided through between the light emitting means and the optical sensor. With regard to the advantages, reference is made to the description of the method.

The conveying means has preferably a multiplicity of conveying sections, which are used to accommodate one or more print shop products. In further embodiments, the conveying means has supporting planes, grippers or pockets.

As occasion demands, the apparatus according to the invention has at least one deflection mirror which is arranged between the first side of the print shop products and the light emitting means and which, in this case, forms the contrast light source. The indirect illumination of the print shop products produced therewith, as compared with conventional, direct print shop product illuminating means, permits a more compact design of the apparatus, which is very much desired, not least on account of the often restricted physical conditions at the user of such apparatus.

In a further embodiment, the optical sensor does not register the silhouette directly but likewise via at least one deflection mirror. As in the preceding paragraph relating to the contrast light, a compact design of the apparatus can be achieved as a result.

The optical sensor or the optical sensors are shielded with respect to ambient light, depending on the requirements, at least in a recording region of the optical sensor, for example by using opaque shielding. Trials have shown that, as a result of the shielding, the contrast of the silhouette is increased as compared to the state without shielding, which makes the registration by the sensor/sensors and post-processing easier.

In a further embodiment, the silhouette registered by the optical sensor is converted into a compensated silhouette if it has a minimal contrast that is sufficient for the subsequent image processing. A compensated silhouette is understood to mean a silhouette having a homogenized brightness, for which reason the compensated silhouette is also designated a homogenized silhouette. To this end, at least one reference image of a geometric location of the conveying means, for example a conveyor compartment, which is empty at the time of recording by the optical sensor, is registered. This reference image is compensated with the silhouette registered by the optical sensor which is produced in the case of a correctly assembled and correctly positioned print shop product. It is clear to those skilled in the art that the silhouette does not have to be an entire view of a print shop product in or on the conveying means but that it can also be merely a partial image or an image of an extract from the entire print shop product in or on the conveying means. The brightness compensation is carried out with a homogenization function in the image processing unit which, in one embodiment, is formed by a processor of the optical sensor. In the homogenization function, in each case a reference image is subtracted from a silhouette representing a print shop product. An image registered by the optical sensor typically has a multiplicity of image points (pixels). If image points having the same coordinates in the reference image and in the silhouette are dark, then this is represented as a light image point on the compensated silhouette. If an image point on the reference image is light and dark in the silhouette at the same coordinates, this results in a dark image point on the compensated silhouette. Instead of dark and light image points, black and, respectively, white image points can also be used. The advantage of a compensated silhouette resides in the fact that it advantageously comprises only black and/or white image points and therefore has a smaller amount of data than a comparable silhouette having gray values. This is advantageous to both an intermediate storage and in particular for the subsequent image processing, for example contour detection. While 1 bit is sufficient to represent a black-white image pixel, a gray image pixel typically requires 8 bits. If a print shop product is missing, then the compensated silhouette is, for example, entirely white.

In the case of thin print shop products which, for example, consist of individual sheets and/or transparent or partly transparent material, no sufficient minimal contrast of the compensated silhouette attained could be achieved in trial operation. Nevertheless, in trial operation good contrast values have been achieved by a type of negative of the transparent print shop product being produced first by means of a differential function prior to the homogenization of the brightness. In practical terms, the silhouette which had been recorded with the transparent print shop product was subtracted from the reference image—which is to say the silhouette without any print shop product. The differential image produced as a result was then subsequently processed with the above-described homogenization function in the image processing unit. In this case, in the homogenization function in each case a reference image is subtracted from the differential image, so that a type of negative silhouette is produced. In one embodiment, the processing steps of the differentiation and of the homogenization are carried out by a processor of the optical sensor. As distinct from the homogenization, by means of the differentiation and the subsequent homogenization, as compared with "pure" homogenization, a negative silhouette is produced which nevertheless exhibits sufficiently high contrast for the image post-processing, for example registration of a contour of the print shop product. Accordingly, in this case an image point which is bright on the reference image and is likewise bright at the same coordinates in the silhouette of the transparent print shop product is represented as a dark image point in the differential image. During the homogenization of the brightness that is subsequently carried out, an image point that is dark in the differential image remains a dark image point in the negative silhouette. On account of the identical image processing, in the present description no further distinction will therefore be drawn either between a compensated silhouette and a negative silhouette.

BRIEF DESCRIPTION OF THE DRAWINGS

The invention will be explained below by using Figures, which merely represent exemplary embodiments and in which:

FIG. 11 shows a pictorial illustration of homogenization of the brightness in the event of insufficient contrast of a silhouette produced by the optical sensor.

DESCRIPTION OF PREFERRED EMBODIMENTS

Figure 1:
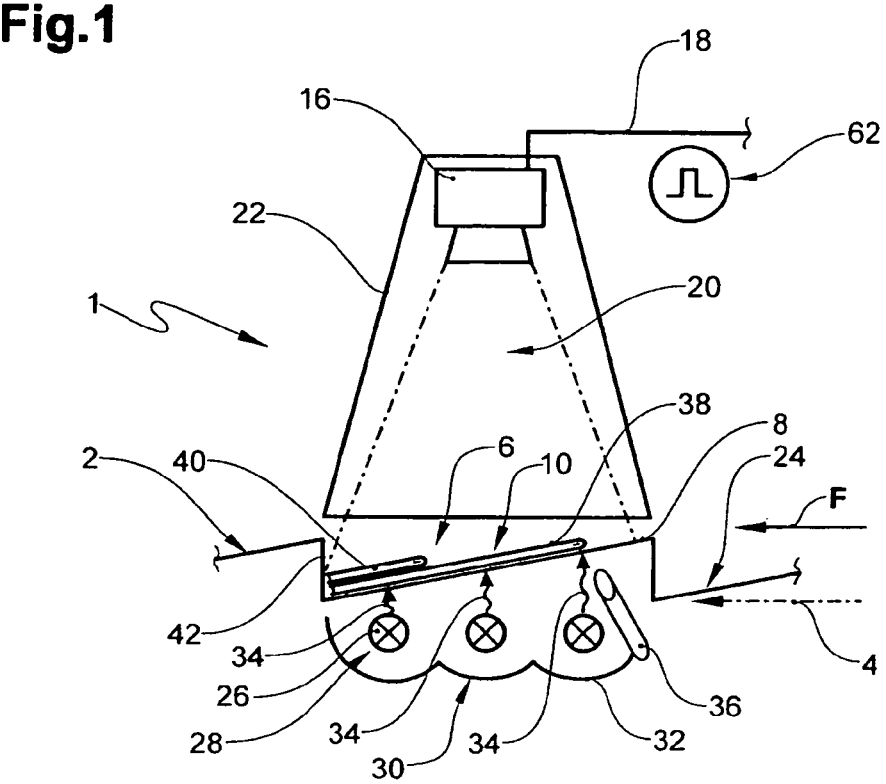
FIG. 1 shows a simplified illustration of a first embodiment of the apparatus according to the invention in side view.

FIG. 1 shows an extract in side view of an apparatus 1 according to the invention, having a conveying means 2 with a multiplicity of conveyor compartments 6 arranged one after another along a conveyor path 4, as is known for example from the application PCT 2007/000026 and CH 1856/06 from this applicant. In FIG. 1, only one conveyor compartment 6 is illustrated as entirely visible. Each conveyor compartment 6 has a supporting surface 8 to accept at least one flat print shop product 10 from a multiplicity of print shop products and is used to transport the print shop products in a conveying direction F. The supporting surfaces 8 in the present embodiment are formed from a textile section and are transparent or translucent.

Depending on the embodiment of the apparatus 1, each conveyor compartment 6 is assigned a holding device in order to press the print shop product 10 assigned thereto against the supporting surface 8, by which means the print shop product is held securely and reliably. The holding device is preferably arranged to run transversely with respect to the conveying direction F, is configured in the manner of a gripper or clamp and preferably extends over a longitudinal edge length of the longest print shop product to be processed, as seen transversely with respect to the conveying direction. In the present figures, the holding devices have not been illustrated, to the benefit of improved clarity.

Arranged above the conveying means 2 in order to register a silhouette 14 is an optical sensor 16 which, for communications purposes, is connected to a signal line 18. With respect to this silhouette 14 and further silhouettes, reference should be made at this point to FIGS. 6 to 11. In trial operation, a so-called Low Cost Vision sensor having an M12 objective with 8 mm focal length was used as optical sensor 16. The processing of the silhouette 14 was carried out with an "embedded digital signal processor" of the Blackfin ADSP type with 1000MMACS (not shown), which is connected via an input/output interface (I/O interface) (likewise not shown) to a management system (likewise not shown). The image registration of the optical sensor is preferably carried out in accordance with the machine cycle rate, that is to say the delivery cycle rate of the conveyor compartments 6 of the conveying means 2 in the conveying direction F.

The optical sensor 16 and its recording region 20 illustrated with a dash-double dotted line are shielded from the outside with an opaque shield 22, in order that no undesired ambient light impairs the quality of the silhouette 14. In FIG. 1, the shield 22 is illustrated in section in order to expose the view of the sensor arrangement. Although the shield 22 can likewise be contained in the further embodiments of the apparatus, it is no longer illustrated, in order to improve the clarity.

Arranged between the two runs of the circulating endless conveying means 2, of which only one conveyor compartment 6 from the upper run 24 can be seen in the extract of FIG. 1, is a light emitting means 28 formed by three fluorescent tubes 26. During trial operation, use was made of three constantly light emitting 36 W fluorescent tubes with electronic ballast as light emitting means 28. The light emitting means 28 in this embodiment is identical with a contrast light source 30. In principle, this structure permits an ideal arrangement of the optical sensors 16 and of the contrast light source 30 on a common light and registration axis. A further advantage as compared with conventional position registration systems resides in the fact that time-consuming fine alignment of the optical sensor 16 and of the light emitting means 28 is dispensed with, since they are relatively uncritical for the registration and evaluation of the print shop product position.

In order to bring about homogenization of the light or contrast light 34 emitted by the light emitting means 28, and also to use the amount of light more specifically, a reflector 32 is arranged under the fluorescent tubes 26 oriented transversely with respect to the conveying direction F, and deflects the light originating from the fluorescent tubes 26 as occasion demands in the direction of the conveying means, so that it can be used as contrast light 34. Although the reflector 32 can likewise be contained in the further embodiments of the apparatus, it is no longer illustrated in order to improve the clarity.

In the apparatus 1 shown in FIG. 1, in the region of a trailing corner of the first part product, as seen in the conveying direction F, there is arranged an additional contrast light source 36 in the form of a spotlight.

On the supporting surface 8 of the conveyor compartment 6 there rests a print shop product 10 comprising a first part product 38, on which a second part product 40 is arranged. Both part products 38, 40 rest on a wall section 42 of the conveyor compartment 6 in the direction of the conveying direction F.

Figure 2:
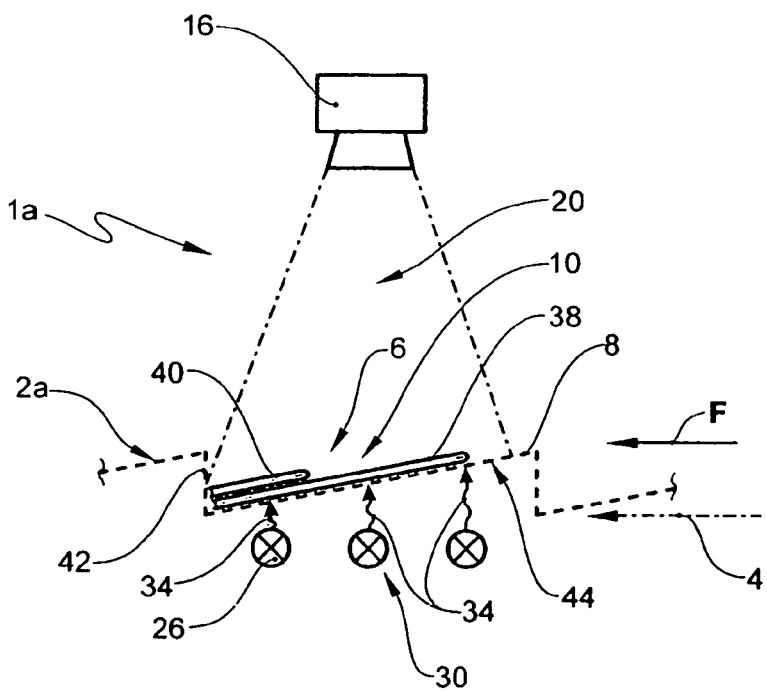
FIG. 2 shows a simplified illustration of a second embodiment in side view.

The second apparatus 1a, shown in FIG. 2, corresponds to that from FIG. 1, apart from the conveying means, for which reason its structure will not be discussed in more detail and identical elements are provided with the identical reference numbers. As distinct from the conveying means 2 shown in FIG. 1, the section of the conveying means 2a shown in FIG. 2 is perforated regularly in order to improve the transparency and is therefore illustrated dotted in simplified form. The perforation 44 is in this case in the form of a perforated plate, which means formed with respectively mutually offset rows of holes.

Figure 3:
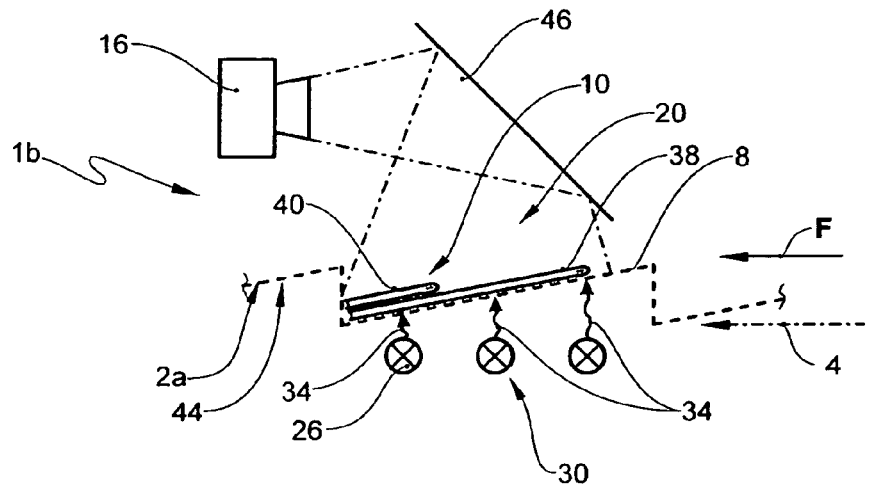
FIG. 3 shows a simplified illustration of a third embodiment in side view.

A third embodiment of the apparatus 1b is shown in FIG. 3 which, with the exception of the silhouette registration, corresponds to that from FIG. 2. As distinct with the direct registration shown in FIG. 2 of the silhouette 14 of the corresponding print shop product 10 by the optical sensor 16, in the structure shown in FIG. 3 the sensor 16 registers the silhouette 14 indirectly via a deflection mirror 46.

By using the following FIGS. 4 to 13, registration and further processing of the silhouette 14 will be explained. Here, the explanation of the function is not just restricted to a perforated conveying means, since it can likewise be transferred to transparent and/or translucent conveying means.

Figure 4:
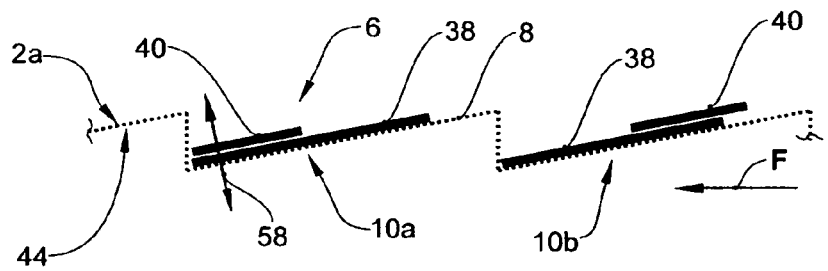
FIG. 4 shows a simplified illustration of the apparatus shown in FIG. 1 with a correctly positioned print shop product and a poorly positioned print shop product in side outline.
Figure 5:
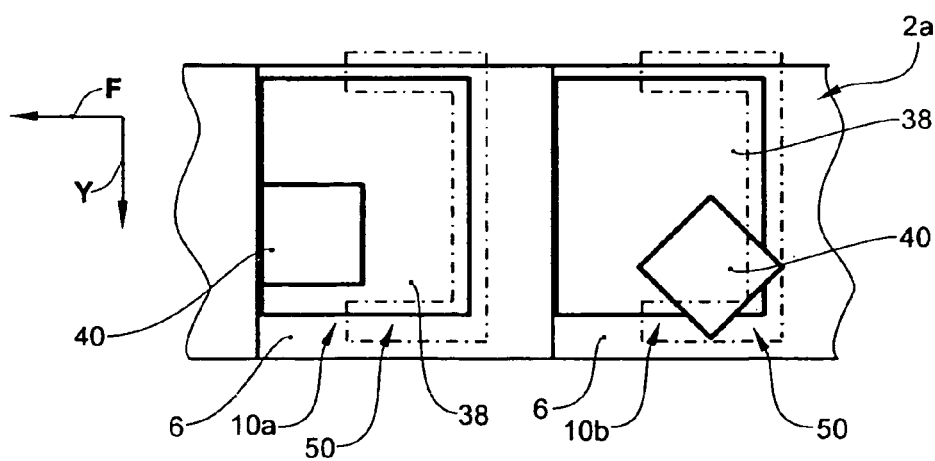
FIG. 5 shows a simplified illustration of the apparatus shown in FIG. 4 in a view from above.

In FIG. 4, viewed in conjunction with FIG. 5, two adjacent conveyor compartments 6 can be seen. For improved clarity, the perforations of the conveyor compartments 6 of the conveying means are illustrated only in the cross section of FIG. 4 but not in the outline of FIG. 5. While, in the left-hand conveyor compartment 6, there lies a print shop product 10a correctly assembled and correctly aligned relative to the supporting surface 8, in the following conveyor compartment 6, as seen in the conveying direction, and arranged on the right thereof there is a print shop product of which, although correctly assembled, the first part product 38 and second part product 40 have been displaced with respect to each other in an undesired way. For the purpose of better readability, the print shop product correctly assembled and correctly aligned relative to the supporting surface 8 will be designated below as a correct print shop product 10*a* and every other print shop product, such as a correctly assembled print shop product of which the first and second part products 38, 40 are displaced either with respect to each other and/or relative to the supporting surface 8 in an undesired way, will be designated below as a defective print shop product 10*b*. The conveying direction of the conveying means 2*a* is designated by F, while a trailing edge 48 of the print shop products 10*a*, 10*b* extends transversely with respect to the conveying direction F in the direction Y.

Figure 8:
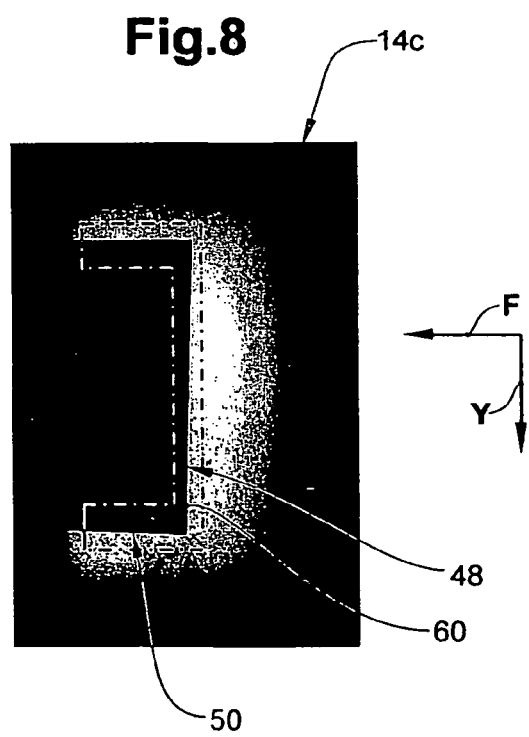
FIG. 8 shows a third silhouette in the illustration shown in FIG. 6 but with a correctly positioned print shop product.
Figure 9:
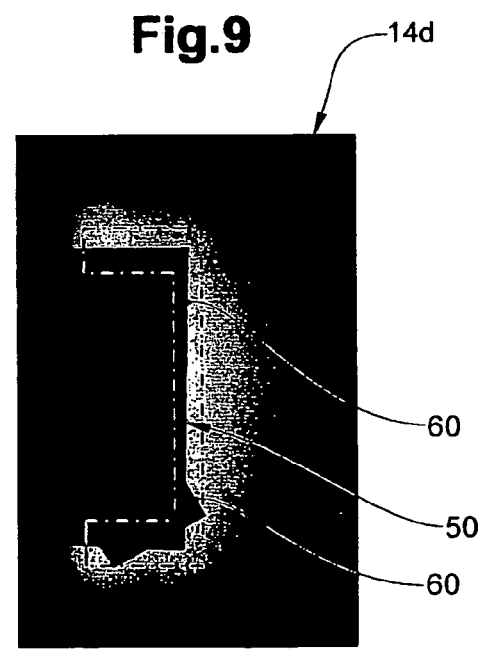
FIG. 9 shows a fourth silhouette in the illustration shown in FIG. 6 but with a poorly positioned print shop product.

A high-contrast image extract 50 or reference contrast region of the silhouette in this case comprises the longitudinal edge 48 of the print shop product which runs transversely with respect to the conveying direction F and the rear regions thereof, adjacent to the trailing longitudinal edge 48, of the transverse edges 52 extending in the conveying direction F (see also FIGS. 8 and 9). On the basis of the high-contrast image extract 50, the image processing unit preferably arranged in the optical sensor 16 calculates a contour 60 of the print shop products 10, 10*a*, 10*b*. On the basis of the contour 60, in the present case a control signal 62 is generated, output via the communications line 18 (see FIG. 1) and used for the subsequent removal of defective print shop products 10*b*.

Figure 6:
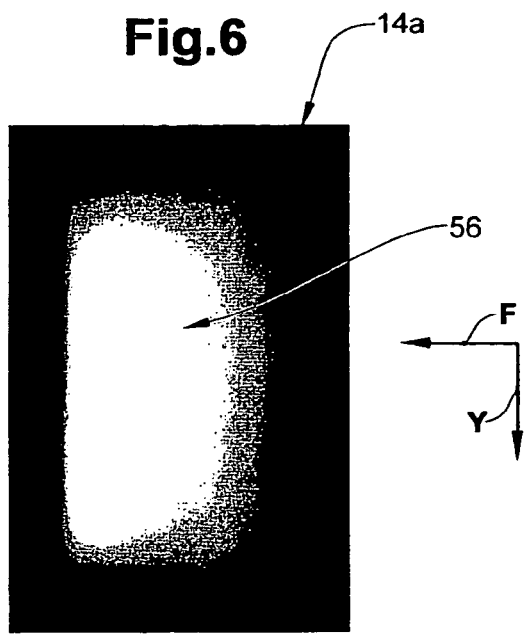
FIG. 6 shows a first silhouette, in which no print shop product is present.

The first silhouette 14*a*, illustrated in FIG. 6, is offered to the optical sensor 16 of the apparatus 1*a* according to FIG. 2 when there is no print shop product 10, 10*a*, 10*b* in the conveyor compartment 6.

Figure 7:
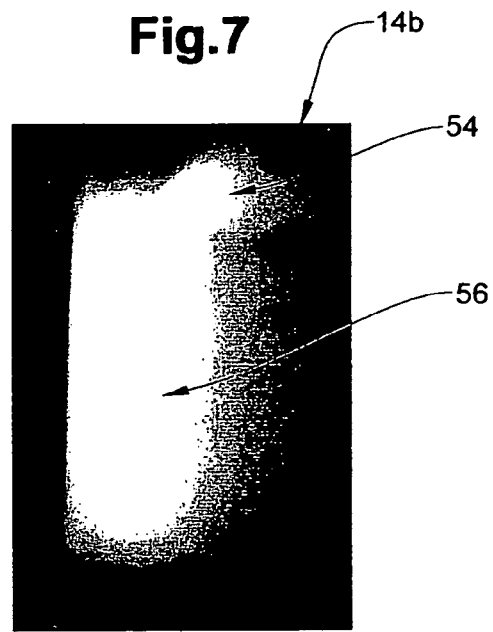
FIG. 7 shows a second silhouette in the illustration shown in FIG. 6, one region additionally being illuminated.

The second silhouette 14*b*, illustrated in FIG. 7, is offered to the optical sensor 16 of the apparatus 1 according to FIG. 1 when there is no print shop product 10, 10*a*, 10*b* in the conveyor compartment 6. The additional contrast light source 36 forms a bright illumination region 54 which reaches partially beyond an edge region of the standard bright illumination region 56 produced by the fluorescent tubes 26, so that an overall illumination region similar to a cloud is produced. In the following text, this embodiment will not be discussed in more detail, since, in relation to the image registration and image processing/image further processing, it is identical to the other embodiments of the apparatus.

FIG. 8 shows a third silhouette 14*c* originating from that of FIG. 6, which is produced in the case of a correct print shop product 10*a*. As distinct from the latter, FIG. 9 shows a fourth silhouette 14*d* originating from that of FIG. 7, which is produced in the event of a defective print shop product 10*b*. FIG. 9 clearly shows a further advantage of the present invention. For the silhouette 14*d*, it is specifically unimportant at what height 58 (see FIG. 4) with respect to the print shop product 10*b* a defect or wrongly aligned part product 38, 40 is located, since a distinction is merely drawn as to whether the entire print shop product is correct or defective overall. Furthermore, FIG. 9 reveals that, even in the case of thin part products, such as second part products 40 which, on account of their nature, are partly transparent, a comparatively high-contrast silhouette 14*d* can be achieved. It is conceivable that, in the case of particularly thin part products, the luminous intensity of the contrast light source is adapted appropriately, so that a high-contrast silhouette 14 can nevertheless be achieved. In the following text, a further variant relating to increasing the contrast of the silhouette will be discussed in more detail.

Figure 10:
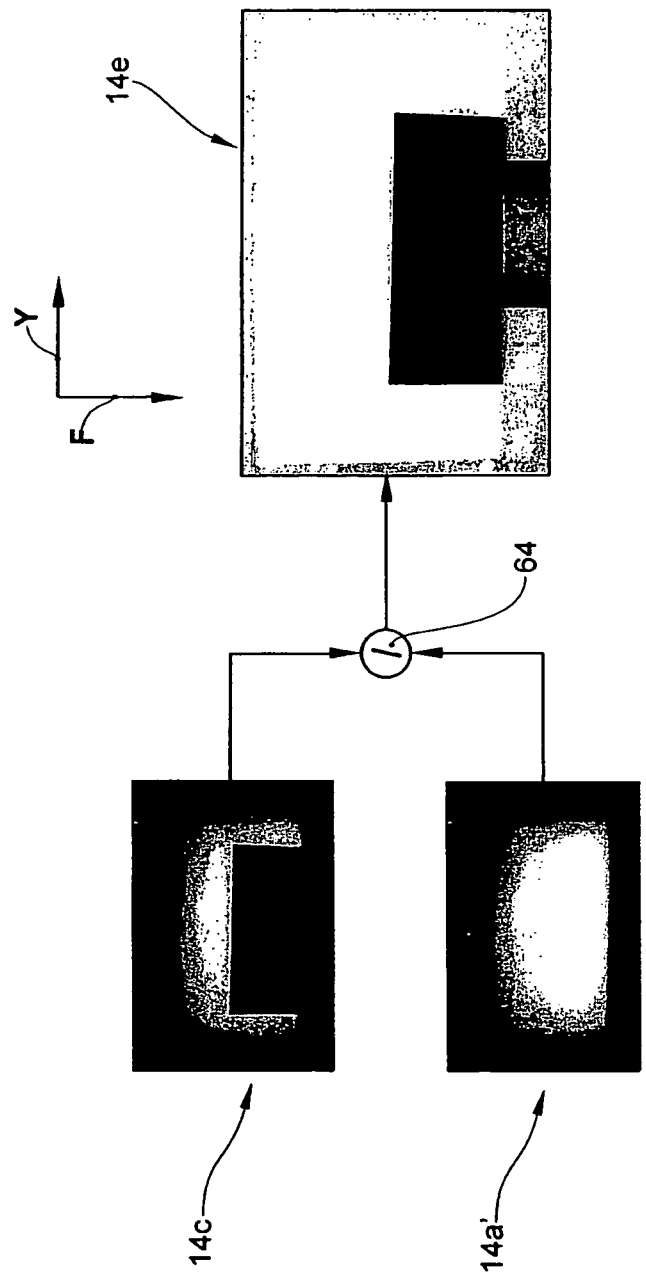
FIG. 10 shows a pictorial illustration of homogenization of the brightness in the event of sufficient contrast of a silhouette.

By using FIG. 10, homogenization of the brightness will be explained. By using a homogenization function 64, in the image processing unit, preferably that belonging to the optical sensor 16, a reference image 14*a*', which appears the same as the silhouette 14*a* and therefore bears a corresponding reference number, is subtracted from the silhouette 14*c*. The difference resulting from this will be designated a compensated silhouette 14*e* below. The compensated silhouette 14*e* has a clearer contrast course as compared with the silhouette 14*c*. The compensated silhouette 14*e* from FIG. 10 in this case forms an ideal basis for the high-contrast image extract 50, since it has only black and white image points or pixels, which in each case can be represented and processed further by a 1-bit item of information.

FIG. 11 shows a pictorial illustration of the production of a high-contrast silhouette by using a low-contrast silhouette 14*f* produced on account of a transparent print shop product. The transparent print shop product was in this case formed by a partly transparent individual sheet. By means of a difference function 66, in the image processing unit, preferably that belonging to the optical sensor, the low-contrast silhouette 14*f* is subtracted from the reference image 14*a*'. A differential image 68 emerges from the difference function 66. This differential image 68 is then converted into a negative silhouette 14*g* by using the above-described homogenization function 64 in the image processing unit, by means of subtracting the reference image 14*a*' from the differential image 68. The difference function 66 and the homogenization function 64 are preferably likewise implemented in a processor belonging to the optical sensor 16. With respect to its further image further processing, the negative silhouette 14*g* corresponds to a compensated silhouette, for which reason it is possible to dispense with a separate explanation of the image further processing for the negative silhouette 14*g*.

The invention claimed is:

1. A method for optical detection of the position of flat printed print shop products (10, 10*a*, 10*b*), the method comprising:
   postpress processing the print shop products (10, 10*a*, 10*b*) on a circulating endless conveyor including a plurality of conveying sections (4);
   guiding the flat printed print shop products (10, 10*a*, 10*b*) by transparent conveying means (2, 2*a*) of one of the conveying sections (4) between at least one contrast light source (30) and at least one optical sensor (16); and
   irradiating a first side of the flat printed print shop products (10, 10*a*, 10*b*) by the contrast light source (30) to produce a silhouette (14, 14*a*, 14*b*, 14*c*, 14*d*, 14*f*), which is registered by the optical sensor (16).

2. The method as claimed in claim 1, wherein, in order to increase the contrast of the silhouettes (14, 14*a*, 14*b*, 14*c*, 14*d*, 14*f*), subregions (54), in particular corner regions of the print shop products (10, 10*a*, 10*b*), are additionally irradiated with contrast light (34).

3. The method as claimed in claim 1, further comprising: homogenizing silhouettes (14*c*, 14*f*) by producing differential images (14*e*, 68) by the silhouettes (14*f*) being subtracted from a reference image (14*a*') or by a reference image (14*a*') being subtracted from the silhouettes (14*c*).

4. The method as claimed in claim 3, wherein the differential images (68) of low-contrast silhouettes (14*f*) are homogenized in order to increase the contrast, by reference images (14*a*') being subtracted therefrom, so that compensated silhouettes (14*g*) are formed.

5. The method as claimed in claim 1, wherein only a high-contrast image extract (50) from the silhouettes (14, 14*a*, 14*b*, 14*c*, 14*d*) or from the compensated silhouettes (14*e*, 14*g*) is used for subsequent image processing.

6. The method as claimed in claim 5, further comprising: calculating a contour (60) of the print shop products (10, 10a, 10b) on the basis of the high-contrast image extract (50).

7. The method as claimed in claim 6, wherein the contour (60) is calculated in an image processing unit of the optical sensor (16).

8. The method as claimed in claim 6, further comprising generating a control signal (62) on the basis of the contour (60).

9. The method as claimed in claim 8, wherein the control signal (62) effects special treatment of the relevant print shop products (10b) in or after the conveying section (4).

10. The method as claimed in claim 1, wherein the contrast light source (30) emits homogenized contrast light (34).

11. The method as claimed in claim 1, wherein the print shop product (10, 10a, 10b) is irradiated by the contrast light source (30) through the conveying means (2a).

12. An apparatus (1, 1 a, 1 b) for optical detection of the position of flat printed print shop products (10, 10a, 10b), the apparatus (1, 1 a, 1 b) comprising:
- a circulating endless conveyor including a plurality of conveying sections (4); and
- one of the conveying sections (4) including transparent conveying means (2, 2a) for moving the flat printed print shop products (10, 10a, 10b) along the one of the conveying sections (4) between at least one contrast light source (30) and at least one optical sensor (16), wherein the conveying means (2, 2a), contrast light source (30) and optical sensor (16) are arranged in such a way that a first side of the flat printed print shop products (10, 10a, 10b) is irradiated by the contrast light source (30) to produce a silhouette (14, 14a, 14b, 14c, 14d, 14f), which is registered by the optical sensor (16).

13. The apparatus as claimed in claim 12, wherein the conveying means (2, 2a) are at least partly transparent and can be is guided at least partly through between the contrast light source (30) and the optical sensor (16).

14. The apparatus as claimed in claim 12, wherein the conveying means (2, 2a) comprise conveyor compartments (6), supporting planes or grippers.

15. The apparatus as claimed in claim 14, wherein the conveying means (2, 2a) comprises a multiplicity of conveyor compartments which, in turn, have a perforation (44) and/or are translucent and/or are transparent.

16. The apparatus as claimed in claim 12, wherein the contrast light source (30) comprises contrast light (34) from a light-emitting means (28), homogenized with the aid of light reflectors (32).

17. The apparatus as claimed in claim 12, further comprising at least one deflection mirror (46) arranged between the print shop products (10, 10a, 10b) and optical sensor (16) and/or contrast light source (30).

18. The apparatus as claimed in claim 12, wherein the optical sensor (16) is shielded with respect to ambient light.

* * * * *